United States Patent [19]
Leibrick et al.

[11] 3,848,728
[45] Nov. 19, 1974

[54] CONVEYOR AND SORTING SYSTEM

[75] Inventors: Peter Leibrick, Diamond Bar; Nick H. Terry, Temple City, both of Calif.

[73] Assignee: Butz Engineering Corporation, Azusa, Calif.

[22] Filed: Feb. 1, 1973

[21] Appl. No.: 328,655

[52] U.S. Cl.................. 198/155, 198/38, 198/203, 214/11 R
[51] Int. Cl............................................ B65g 17/00
[58] Field of Search............ 198/38, 129, 203, 145, 198/146, 155; 214/11 R, 60, 62 A, 62 R; 46/216, 218, 40; 104/88 R; 403/58

[56] References Cited
UNITED STATES PATENTS

| | | | |
|---|---|---|---|
| 2,027,499 | 1/1936 | Tully | 403/58 |
| 2,850,149 | 9/1958 | Bankauf | 198/203 |
| 2,969,137 | 1/1961 | Baumann et al. | 198/38 |
| 3,185,108 | 5/1965 | Muller | 198/203 |
| 3,231,066 | 1/1966 | Harrison et al. | 198/38 |
| 3,596,400 | 8/1971 | Cheng | 46/218 |

*Primary Examiner*—Evon C. Blunk
*Assistant Examiner*—Joseph E. Valenza
*Attorney, Agent, or Firm*—Huebner & Worrel

[57] ABSTRACT

An endless closed loop parcel sorting conveyor system particularly adapted for use between areas of different vertical elevation. The system includes an endless track, contiguous receptacle means forming an endless conveyor mounted on said track for movement therealong and in-line drive means adapted to sequentially engage each of said receptacle means imparting movement to said conveyor.

Additionally, universal coupling means between each receptacle means are provided to assure conformity with the contour of said endless track during travel.

Deflecting means are associated with at least some of said receptacle means for discharge of contents thereon.

12 Claims, 17 Drawing Figures

CONVEYOR AND SORTING SYSTEM

BACKGROUND OF THE INVENTION

Previous conveyor systems embodying tracks and carriage conveyor means have heretofore been limited to either one plane or at the most two planes. These systems are generally referred to as the carousel type and the over-and-under type. The utilization of such conveyor systems has been relatively restricted.

Further, with any previous attempt at a departure from the single or double plane systems the drive means of propelling the endless system has required a number of syncronized motive elements and a positive tie with the conveyor in the system. Such structure has resulted in an inordinate amount of "down time" for repairs and as such are economically not feasible.

SUMMARY OF THE INVENTION

It is an object of this invention to provide an endless closed loop parcel sorting conveyor system particularly adapted for use between areas of different vertical elevation, such as from one floor to another as well as encompassing a large generally horizontal area.

A further object of the invention is to provide an in-line drive means adapted to directly engage the receptacle means and act as both a propellent as well as a brake therefor. The drive means includes anti-slip pads engageable with anti-slip pads on said receptacle means to effect positive traction and gripping.

Another object of the invention is to provide single or multiple pivotal parcel receiving receptacle means each of which may independently be tipped normal to the line of travel for discharge.

Another object of the invention is to provide nonpivotal receptacle means on said carriages whereby external discharge means may be employed to discharge contents thereon normal to the line of travel.

These and other objects and advantages will become apparent from the following description and drawings.

BRIEF DESCRIPTION OF THE PREFERRED EMBODIMENTS

Figure 1:
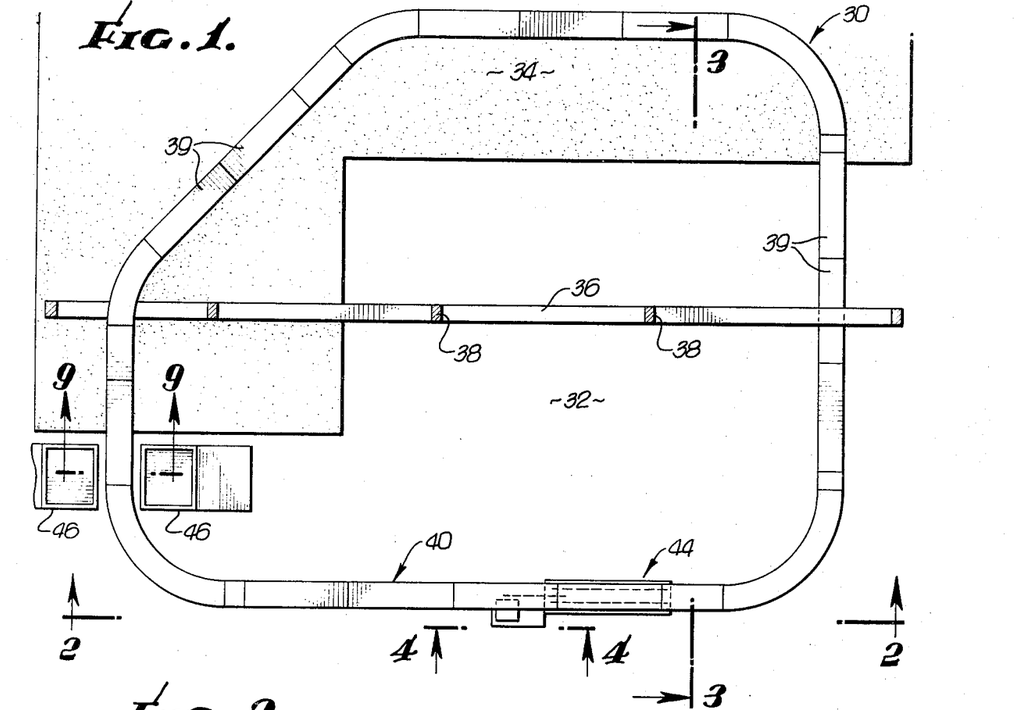
FIG. 1 is a top plan view of a track layout and drive means of the endless parcel sorting conveyor system.
Figure 2:
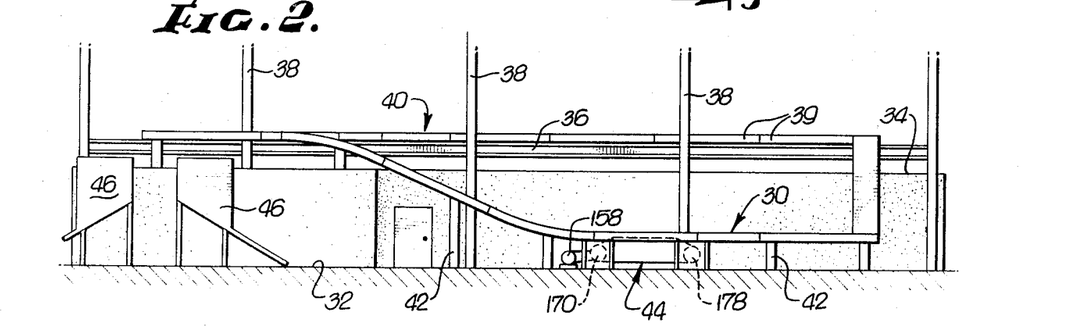
FIG. 2 is a side elevational view of the track taken along line 2—2 of FIG. 1.
Figure 3:
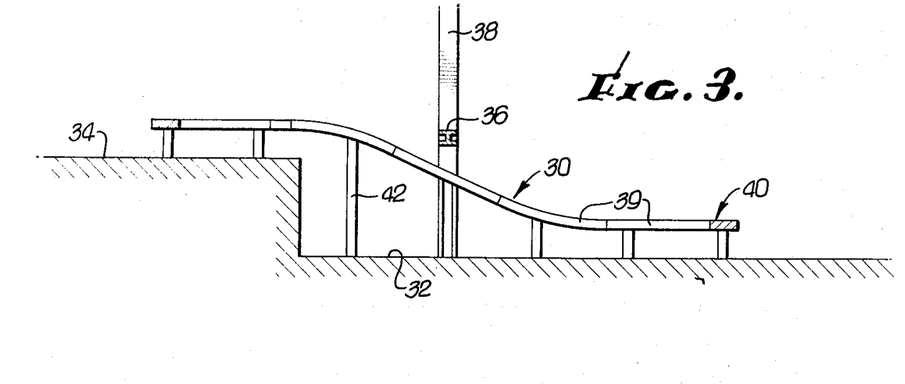
FIG. 3 is an end elevational view of the track taken on line 3—3 of FIG. 3.

FIGS. 1, 2, and 3 illustrate environmental views of a layout of an endless multiple direction parcel sorting conveyor system 30. The embodiment illustrated in these drawings depicts various right angle curves, horizontal portions and elevated portions of the system. For illustration, there is shown a bottom or first floor 32 and an upper or second floor 34. Thus as can be seen, the conveyor system 30 will take in a relatively wide horizontal area and also will move between one or more floors wherein parcels, mail, parts, etc., may be loaded from either or both sides onto the conveyor at any designated station or stations on one floor and discharged on an upper floor or vice versa.

Structurally, there is illustrated a building housing the system 30 having a horizontal center beam 36 and a plurality of vertical roof support beams 38.

The system 30 includes a plurality of track elements 39 which are joined by welding or other means to complete an endless track 40. The track elements 39 are each supported by a plurality of vertical stand supports 42, of different lengths depending upon the elevation of the track elements 39 at a particular point. The horizontal beam 36 in the illustration may be used to support a portion of the track elements 39 on the upper or second floor 34.

Also seen in FIGS. 1 and 2 is the power unit generally designated 44 in association with the track 40. Additionally, for illustrative purposes, FIGS. 1 and 2 also include a pair of conventional discharge chutes 46 on either side of the track 40.

The system 30 as illustrated and described herein is particularly adapted for use in moving mail and parcels in Post Offices, conveying newspapers from the printing room to trucks for delivery, the moving, sorting and discharging of parts, etc., where it is necessary to move such items from one level or horizontal plane to another, and where the horizontal area encompassed by the system is relatively large.

The track element sections 39 of track 40 are best illustrated in cross section in FIGS. 5, 6, 9, 16 and 17 and preferably include spaced apart cross members 48 to which are welded or otherwise secured and extending upwardly therefrom, a pair of right angle support brackets 50 on each end of the cross members 48. These right angle support brackets 50 extend lengthwise and normal to the cross members 48. Spaced intermediate the right angle support brackets 50 are a pair of vertical elongated wall members 52 and 54 which are spaced apart and form a guide chamber 53 therebetween for receptacle conveyor means or carriages generally designated 56. Each of the vertical wall members 52 and 54 are preferably bent inwardly at the top forming inwardly facing tabs 58 and 60. Mounted on the right angle support brackets 50 and extending to the respective vertical walls 52 and 54 are horizontal track platform members 62 and 64.

Figure 5:
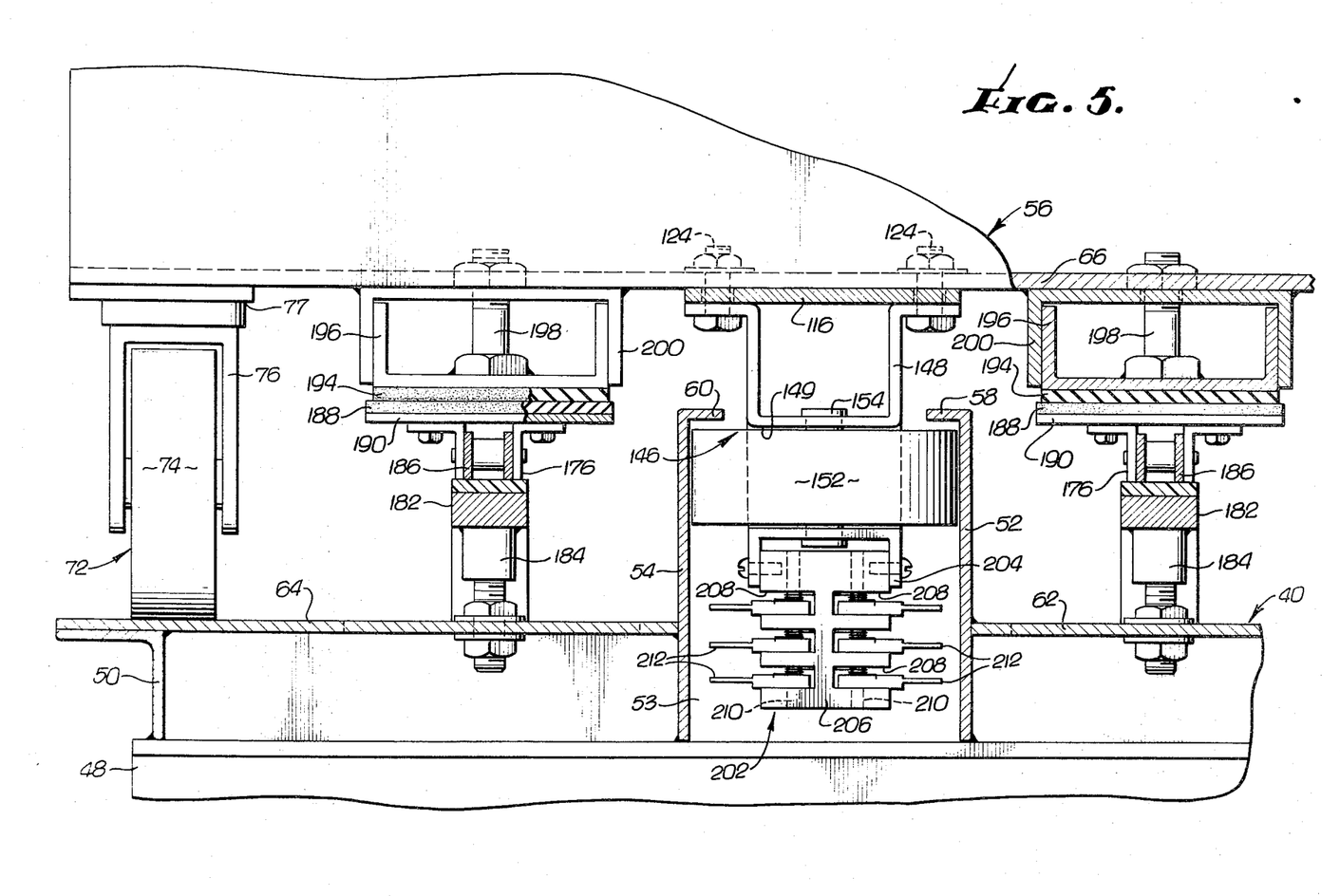
FIG. 5 is a cross sectional view of the track, drive contact means and a receptacle means taken on line 5—5 of FIG. 4.

The guide channel 53 formed between the wall members 52 and 54 extends throughout the entire length of the track 40 as do the horizontal track platform members 62 and 64. The receptacle conveyor means 56 ride on the track platform members 62 and 64 and the guide channel 53 between the walls 52 and 54 is used to maintain each of the receptacle conveyor means 56 in position on the platform members.

Figure 4:
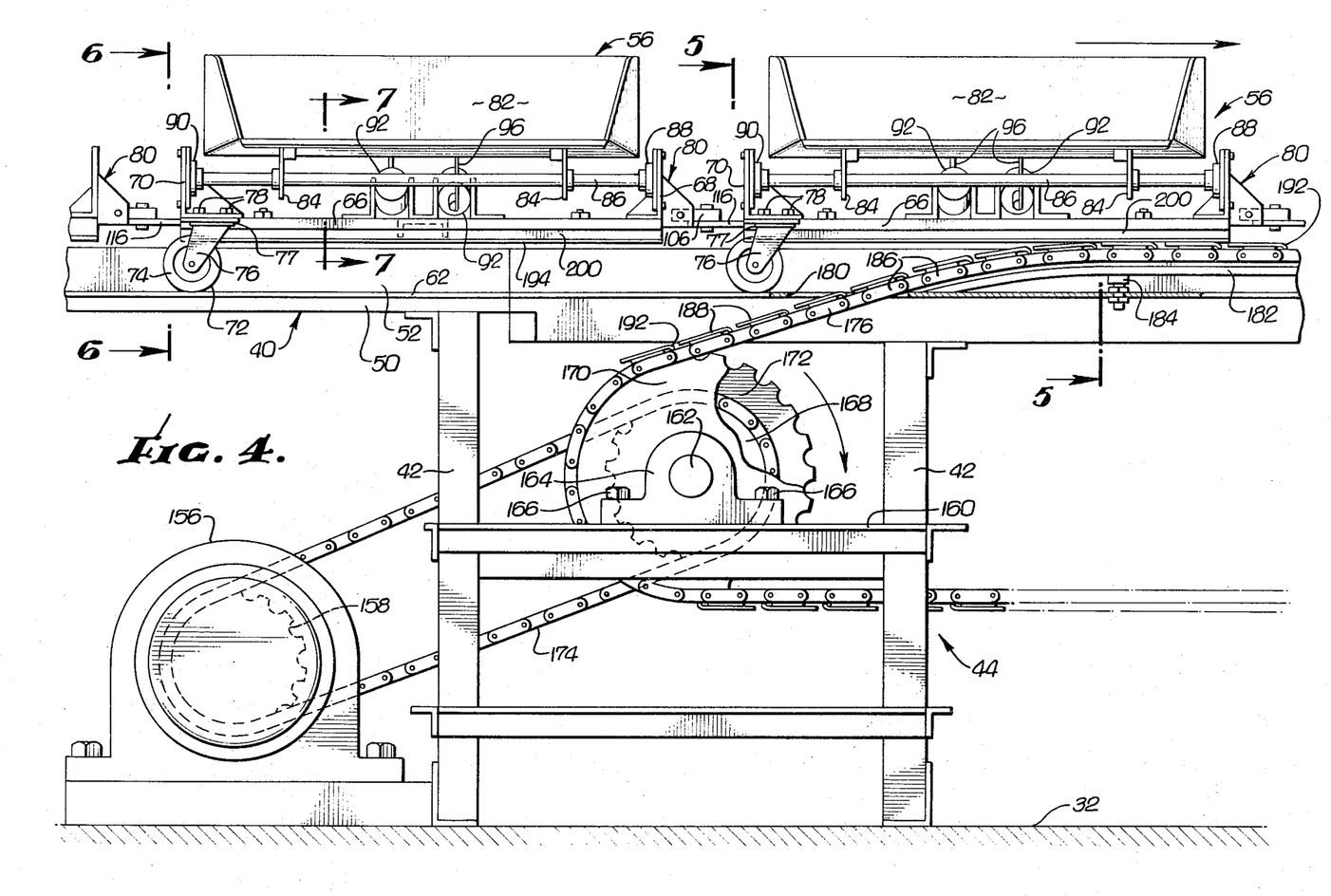
FIG. 4 is a side elevational view partly in section of the drive means, track and receptacle assemblies of the system.

Mounted on the track are a plurality of contiguous receptacle conveyor means 56 such as illustrated in FIG. 4. The receptacle conveyor means 56 each include a generally flat horizontal platform frame 66. The platform frames 66 include a vertical head brace 68 and a vertical rear brace 70. Mounted under the rear brace 70 on the platform frame 66 are spaced apart caster means 72 whereby one caster will roll on the platform 62 and the other on platform 64. The caster means 72 is of a conventional type including a wheel 74, bifurcated support plate 76, ball bearing swivel coupling 77 and the caster 72 attached to the platform frame 66 by means of bolts 78. The caster means 72 is preferably free wheeling so that there is no friction that will develop during movement of the respective receptacle conveyor means throughout the closed loop or endless system 30. Projecting from the head brace 68 of the receptacle conveyor means 56 there is provided a coupling means 80 which is attached to the platform frame 66 of a forward contiguous receptacle conveyor means 56.

The upper structure of the receptacle conveyor means 56 for receiving parcels, sacks, storage of material, etc., may vary depending upon the specific requirement for the moving, sorting, and storage of material.

The receptacle conveyor means 56 illustrated in FIGS. 4, 6, 7 and 9 include a pair of trays 82 which are secured to a pair of spaced apart support arms 84 each in turn are fastened to pivot bar 86. The pivot bar 86 in turn is journaled in a front bushing 88 secured to the head brace 68 and a rear bushing 90 secured to the rear brace 70.

Figure 6:
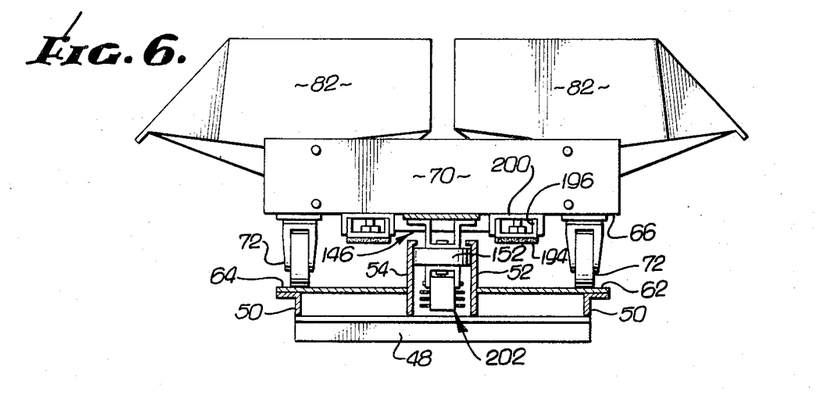
FIG. 6 is an end view taken on line 6—6 of FIG. 4 of one form of receptacle means.
Figure 7:
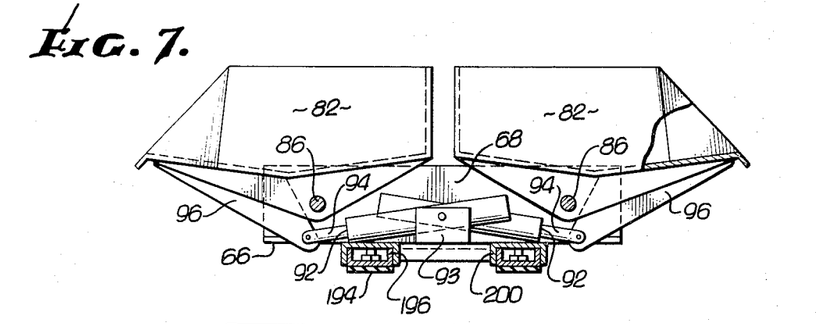
FIG. 7 is a cross sectional view taken on line 7—7 of FIG. 4 showing the mechanism for pivoting the receptacles shown in FIG. 6.
Figure 9:
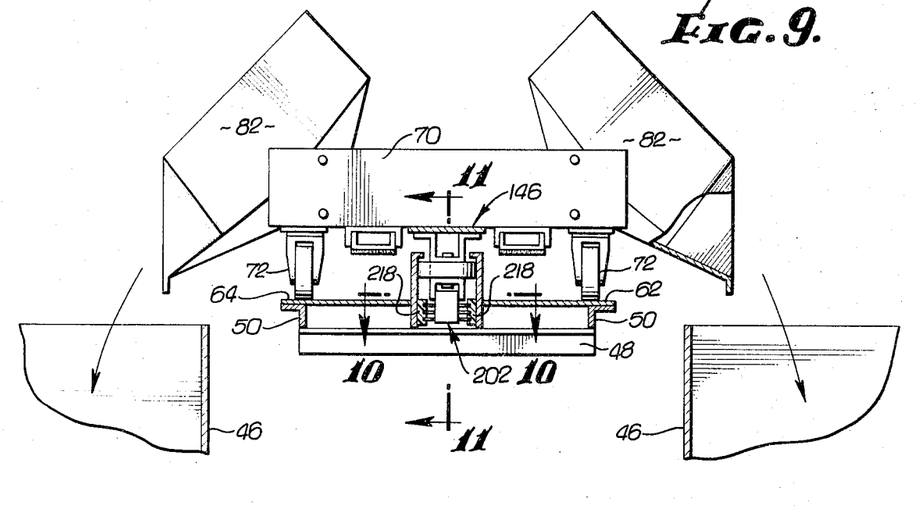
FIG. 9 is a cross-sectional view of the receptacle means pivoted for discharging of contents thereon.

In order to activate the trays 82 from an at rest position such as shown in FIG. 6, to a pivoted discharge position such as shown in FIG. 9, there is preferably provided a pair of electrically activated linear actuators 92 mounted between trunion mounts 93, on frame 66, as best seen in FIG. 7. The actuator 92 includes an actuator rod 94 secured to a strut 96 mounted under each of the trays 82. The linear actuators 92 are of a conventional type whereby the rod 94 may be screw extended are retracted by a motor, not illustrated, which in turn will move the strut 96 and pivot the trays to an at rest position shown in FIG. 6 or a discharge position shown in FIG. 9.

While the actuator 92 is illustrated any other type of pneumatic or hydraulic means for actuation may be employed without departing from the spirit of the invention.

One form of electrical actuation of the respective linear actuators 92 will be described later.

Turning now to the coupling means 80, the details are best seen in FIGS. 12 through 15. The coupling means is of the universal type that will permit bending in any and all directions which in turn will allow each of the respective receptacle conveyor means 56 to move freely and unrestricted around the right angle curve or up or down a sloping portion of the track 40.

Figure 12:
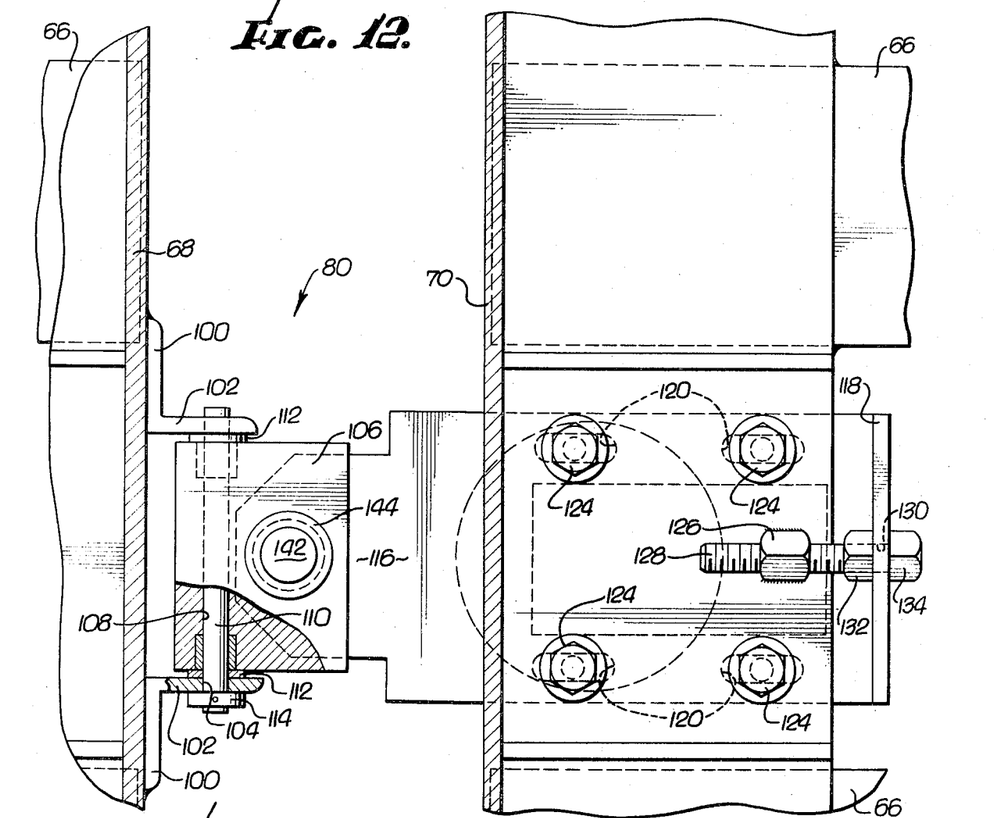
FIG. 12 is a top plan view, partly in cross section of the carriage universal pivot means taken on line 12—12 of FIG. 11.

Mounted on the head brace 68 of each platform frame 66 there are a pair of spaced apart L-brackets having bases 100 and including forwardly projecting extensions 102. Each of the extensions 102 includes therethrough a bore 104 in alignment one with the other. Mounted between the extension 102 is a coupling block 106. The coupling block is horizontally drilled forming a bore 108. Passing through the bore 104 and bore 108 of the extensions 102 and coupling block 106 is a pivot pin 110. In order to prevent wear of the block against the extension 102 there are provided bushing 112 on each side thereof. The pivot pin 110 may be secured in position by means of a lock washer or collar 114.

Figure 11:
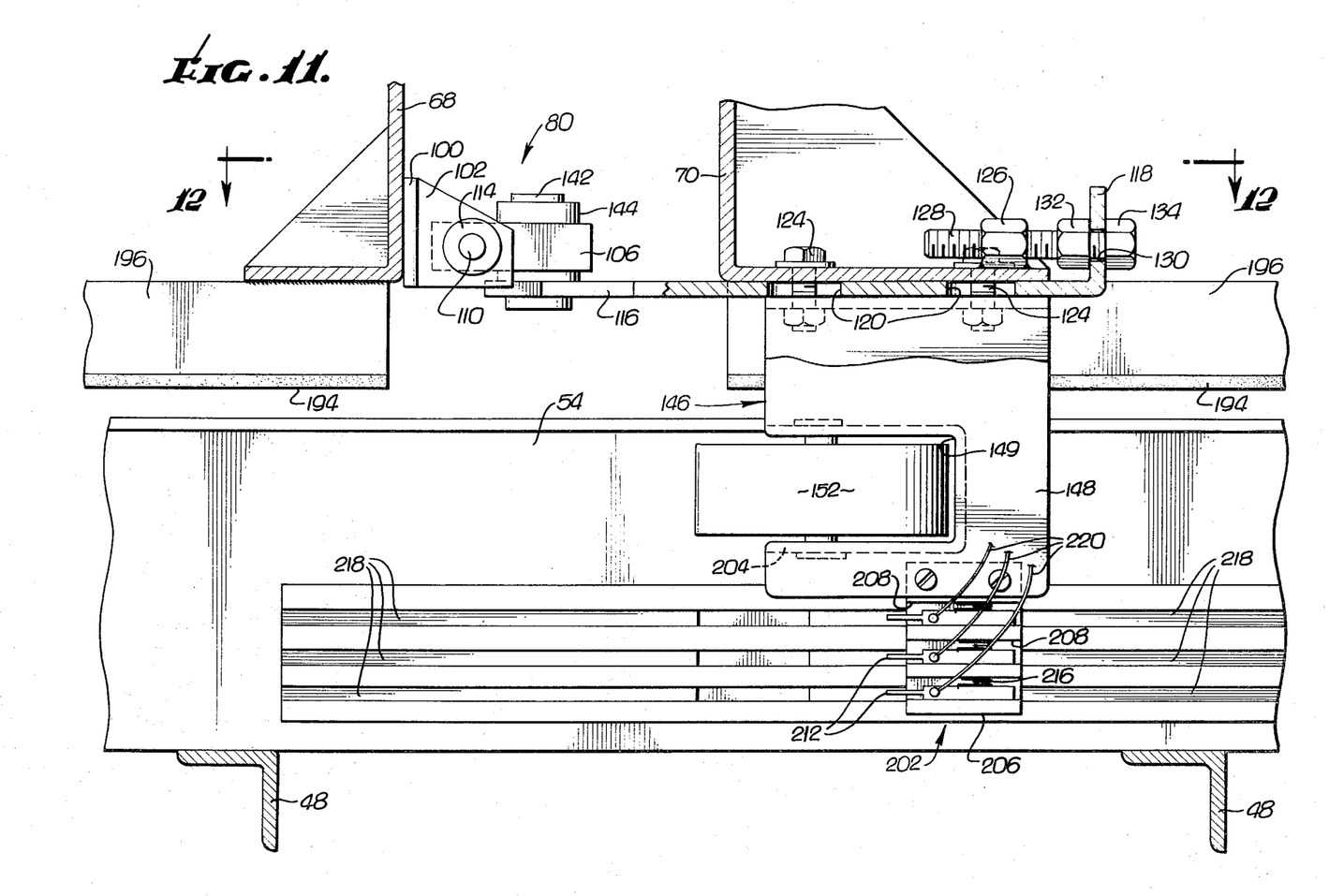
FIG. 11 is a cross-sectional view of further details of the carriage, receptacle, carriage universal pivot means and bus bar taken on line 11—11 of FIG. 9.

In order to complete the coupling 80 there is provided an elongated tongue 116 which projects rearwardly and beyond the rear brace 70 of each of the receptacle conveyor means or carriages 56. The tongue 116 preferably projects through the platform frame 66 and includes a forward upturned flange 118 such as shown in FIGS. 11 and 12. Additionally, the tongue 116 includes a plurality of elongated slots 120 projecting through the tongue for mounting the same to the platform frame 66 and to the rear brace 70. The slots 120 allow the tongue 116 to be shifted horizontally whereby when coupled with the coupling block 106 the entire unit, when in a flat horizontal plane, will resemble a position such as shown in FIG. 11. In order to secure the tongue to the carriages 56 bolts 124 are provided.

In order to adjust the tongue 116 there is secured to the brace 70 by welding or other means a nut 126, and threaded into the nut is a bolt shank 128 which extends through a bore 130 in flange 118. In order to adjust the tongue rearwardly or forwardly nuts 132 and 134 are tightened or loosened so that the adjustment may be made.

At the rear end of the tongue 116 a vertical bore 136 if formed therethrough. The bore 136 is aligned with a vertical bore 138 formed in the coupling block 106. Fitted within the bore 138 is a bushing 140 and extending through the bushing is a vertical pivot pin 142. In order to lock the pivot pin in position a locking collar or washer 144 is provided.

Figures 13, 14, 15:
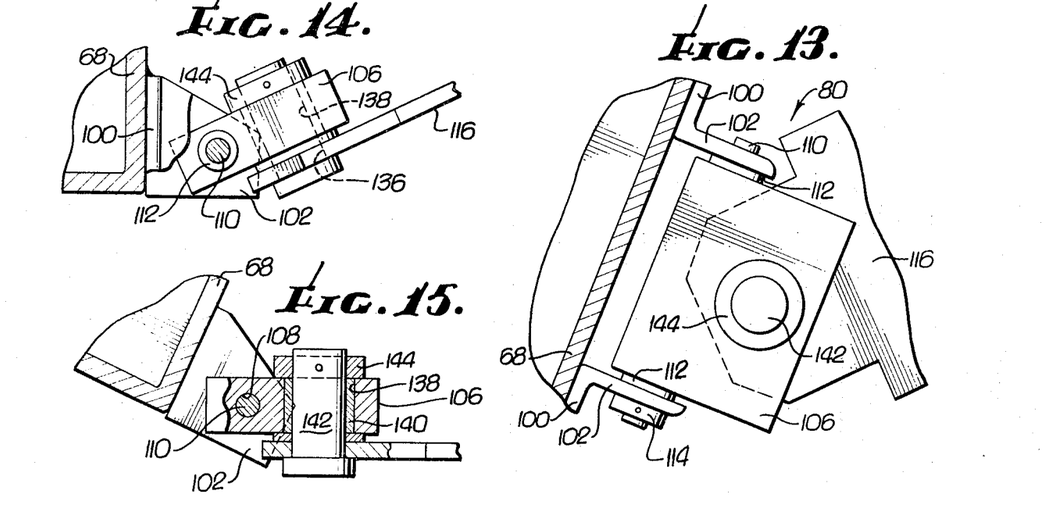
FIGS. 13, 14 and 15 are further detailed illustrations of the carriage universal pivot means.
Figure 16:
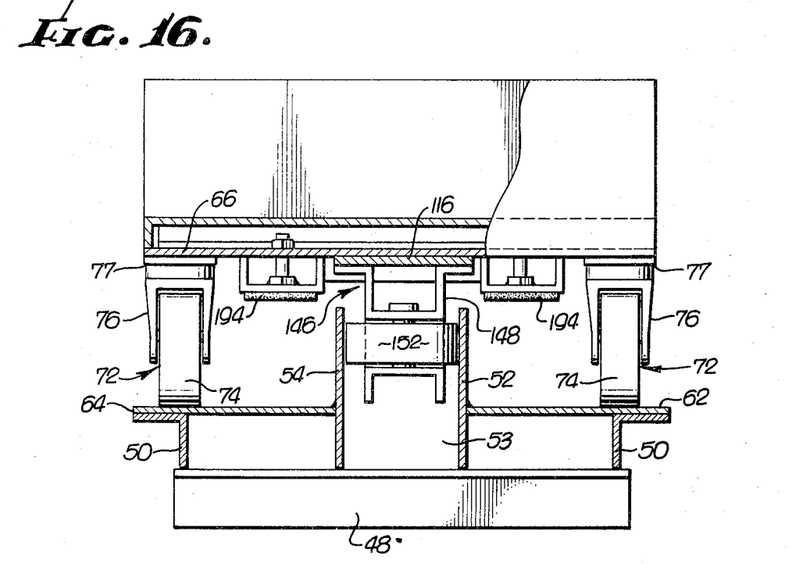
FIG. 16 is a cross-sectional view of a carriage with a further modified receptacle means.

Thus as can be seen in FIGS. 13, 14 and 15, with the coupling means 80, the respective carriages 56 may be turned such as shown in FIG. 13 or tilted upwardly or downwardly as is illustrated in FIGS. 14 and 15. In this way with each carriage 56 connected to the one in front there is provided a contiguous conveyor which may travel along the track 40 unrestricted when either moving around curves or in an inclined or declined plane.

There is further provided as previously mentioned guide means generally designated 146 on each carriage 56 whereby the respective carriages are guided and retained on the platforms 62 and 64 of the track 40 as they proceed around the endless system. Each of the receptacle conveyor means or carriages 56 are provided at the rear portion under the tongue 116 with a downwardly projecting guide wheel bracket 148 which is secured to the platform frame 66 and tongue by means of the bolts 124 best seen in FIG. 5. The bracket 148 is recessed at 149 and a guide wheel or roller 152 is pivotally mounted therein. The guide wheel 152 is mounted on a vertical axle 154 and the rotational movement of the guide wheel 152 is in a horizontal plane. Thus it can be seen that the guide wheel 152 which is slightly less in diameter than the channel 53 created between the upright walls 52 and 54 and will bear against either of the walls and will guide and maintain each of the individual carriages 56 during travel on the track 40.

The in-line power unit 44 illustrated schematically in FIGS. 1 and 2 is seen in detail in FIGS. 4 and 5.

There is preferably provided a variable speed electric motor 156 which is secured to the floor 32 in any conventional manner. Secured to the shaft of the motor 156 is a conventional motor sprocket 158.

Extending between two adjacent vertical stand supports 42 of the track 40, as best seen in FIG. 5, is a sprocket support strut 160 on both sides of a track section 39. Extending between the structs 160 is a shaft 162 having its respective ends journaled in bearings 164. The bearings are affixed to the support struts 160 by means of bolts 166. Centrally affixed to the shaft 162 is a drive sprocket 168 and transversely spaced on either side of the drive sprocket 168 are a pair of sprockets designated front sprocket 170 and rear sprockekt 172. In other words, in viewing FIG. 5 the front sprocket 170 is closest to the viewer and the rear sprocket is transversely spaced from behind the front sprocket 170.

In order to rotate the shaft 162 a conventional sprocket chain 174 engages the motor sprocket 158 and drive sprocket 168.

Mounted on the front and rear sprockets 170 and 172 are drive chains 176 each of which extend around the respective front and rear sprockets 170 and 172 to idler sprockets 178 illustrated in FIG. 2.

Each of the drive chains 176 extend through slotted openings 180 of platform 62 and 64 in the track section 39. Adjacent the front of each slotted opening 180, as best seen in FIG. 5, is an elongated ramp chain guide bar 182 extending in-line with the track 40 upon which the endless drive chains 172 may ride in an elevated condition for a predetermined distance prior to returning through a slotted opening, not seen, in the platform 62 and 64 and around the idler sprocket 178. In order to maintain the guide bar 182 in position, a plurality of stanchions 184 may be provided.

In order to create the driving and braking impact to each of the carriage means 56 there are provided friction contact means. Each of the links 186 of the drive chains 176 are provided with individual positive anti-slip pads or friction pads 188 which are secured to a support 190 by means of rivets or any other type of fastening device. It should also be noted that preferably the forward end 192 of pads 188 are downwardly curved in order to assure smooth and proper positive mating with a friction strip 194 which is mounted on each of the carriage means 56 for the entire length thereof. The friction strip 194 and friction pads 188 are preferably of a material wherein the upper surface of the pad 188 and the exposed surface of the strip 194 are roughened so as to create a positive friction gripping contact.

The friction strip 194 is secured to an elongated U-shaped bracket 196 by riveting or other means. In turn the U-shaped bracket 196 is secured to the platform 66 of the carriages 56 by maans of bolt 198.

As can be seen in FIG. 5, each of the U-shaped brackets 196 interfit within an inverted U-shaped bracket 200 which are welded or otherwise secured to the platform 66 on either side of the guide wheel 152. Because of bolts 198 the U-shaped brackets 196 are removable so that the friction strips 194 may be replaced when they become worn.

As the motor 156 is activated and the shaft 162 revolves, the chains 176 also rotate causing the individual friction pads 188 to engage the elongated friction strips 194 on each side of the carriage means and drive that particular carriage and in turn the entire contiguous united carriage assembles through the orbit of the track element layout such as seen in FIG. 1.

The length of the portion of drive chains 176 which are elevated and adapted to contact the carriage elements 56 may be varied in length so that either one or more carriage means may be simultaneously engaged by the friction pads.

Additionally, the friction pads when engaging the friction strip will act as a braking force where gravity may exert increased pressure when the receptacle carriage means are loaded particularly on those carriage means on the downward run of the track portions vertically elevated above the power area. In other words, the increased pressure will not result in a slipping of the carriage means over the friction pads 188, but they will actually exert a back pressure to counteract the increased forward pressure.

It should be noted that while there is illustrated one power unit 44, additional power units may be spaced around the conveyor system 30 depending upon the length thereof as well as the material which is to be conveyed by the system and the sizes of the individual carriage means 56.

When some of the carriage means 56 are to include linear actuator means 92 such as illustrated in FIGS. 4, 6 and 7, one form of electrically activating them is through an electrical bus bar means 202. The details of which will be found in FIGS. 5, 9, 10 and 11.

Figure 10:
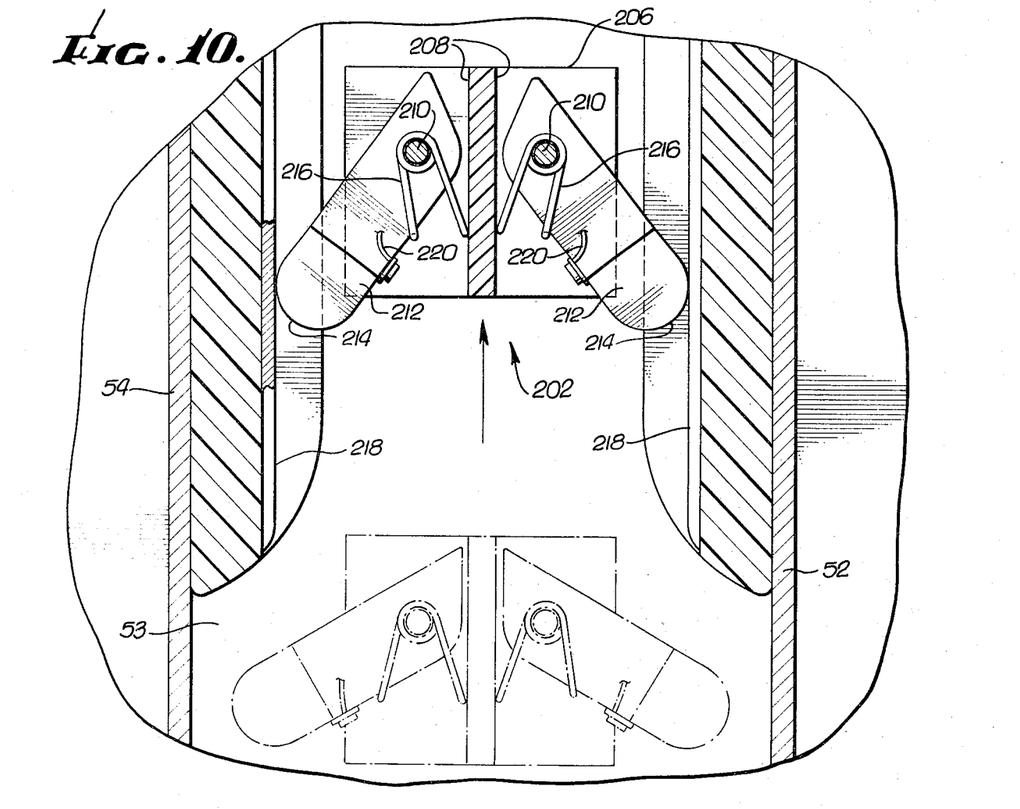
FIG. 10 is an enlarged cross-sectional view taken on line 10—10 of FIG. 9 illustrating details of electrical bus bar contacts.

Again referring to guide bracket 148, best seen in FIG. 11, the bracket includes a lower portion 204 to which is secured an electrical insulation block 206. The block 206 has a number of recesses 208 vertically spaced one upon the other as seen in FIGS. 5 and 11. Mounted within each of the recesses 208 on a common vertical shaft 210 extending through the entire block 206 are a plurality of electrical contact fingers 212. The individual fingers 212 as best seen in FIG. 10 are alongated with a rounded front portion 214. Each of the fingers preferably includes a tension spring 216 to constantly urge the fingers outwardly whereby they may engage corresponding electrically chargeable metallic strips 218. Extending from each of the fingers 212 are electrical wires 220 which in turn may extend upwardly adjacent the bracket 148 through the platform 66 to the linear actuators 92.

The metallic strips 218 may be strategically located on the interior of each of the vertical walls 52 and 54 around the track elements 40. When electrical energy is supplied to the metallic strips 218 and the conveyor fingers 212 engage the strips such as seen in FIG. 10 energy will be transmitted through the electrical wires 220 to the linear actuator whereby the rod 94 may be moved inwardly and outwardly to pivot the trays 82 for discharge of parcels or mail thereon.

It is to be appreciated that by breaking or horizontally spacing the strips 218 as shown in FIG. 11, the polarity may be reversed as the fingers 212 move therealong so that the linear actuators may be moved inwardly or outwardly as necessary. Therefore, once the trays 82 have been pivoted to discharge the material thereon, the fingers may then contact a second series of metallic strips 218 whereby the procedure may be reversed and the actuator extended upwardly pivoting the trays to the normal at rest position such as seen in FIGS. 6 and 7.

It should also be appreciated that the electrical charging of metallic strips 218 may be accomplished manually by a workman in the area when it is desired to discharge a product or it may be computerized so that there is an automatic charging and discharging of the strips dependent upon the material to be discharged and the frequency by which it is operated. The particular control of the electrical charging and discharging of strips 218 does not form a part of the present invention.

Figure 8:
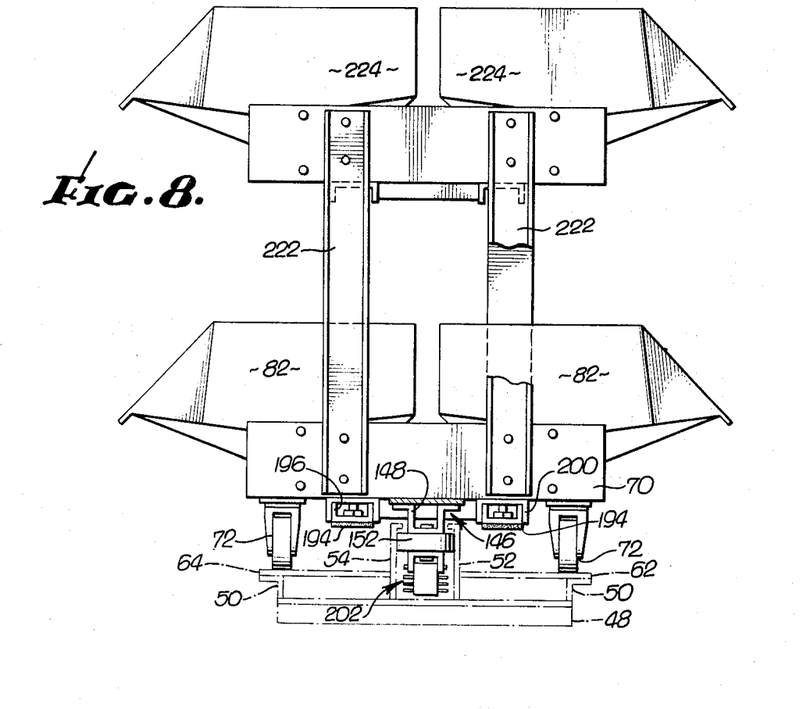
FIG. 8 is a modified form of multiple receptacle means.

With the exception of the electrical bus bar means 202 it can be readily appreciated that modifications to the carriage means 56 may be accomplished. One such modification is illustrated in FIG. 8 wherein extending upwardly from the carriage are a pair of vertical supports 222 with an upper pair of trays 224 mounted thereon. The same type of linear actuators 92 may be employed for each of the upper trays 224 and by increasing the vertical length of the insulator block 206, the number of contact fingers 212, and the addition of electrical metallic strips, each of the respective trays in the modification of FIG. 8 may be pivoted independently or in unison as the case may be.

Figure 17:
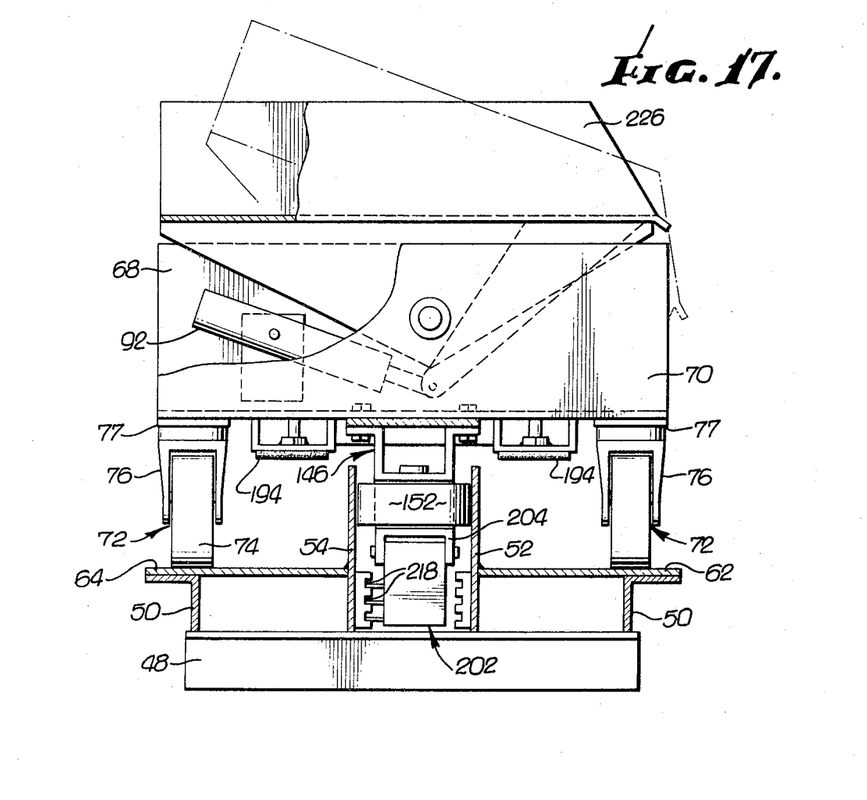
FIG. 17 is an end view partly in cross section of still a further modified single pivotable receptacle means associated with a carriage including means for pivoting said receptacle.

An additional modification of the tray units can be found in FIG. 17 wherein there is a single tray 226 which is dischargeable to one side or the other but not in both directions. Again, this modification would utilize a linear actuator 92 which is activated through the electrical contacts of the fingers 212 with the strips 218.

In operation, the motor 156 may be activated and depending upon the size of the conveyor system 30 and the load thereon, it may be activated at a variable speed or at a fixed speed. This in turn through the sprocket chain 174 will rotate each of the drive chains 176 whereby the pads 188 will engage the anti-slip strips 194 on each side of at least one carriage means 56, advancing it forwardly from left to right such as seen in FIG. 4. The contiguous carriage means 56 will then commence to move and parcels or other material may be loaded on each of the units and move around the system 30 to any specific point or points whrere it is desired to discharge the parcels or other things thereon into such things as the chute 46 in FIG. 1, or additional conveyors, etc.

Although we have herein shown and described our invention in what we have conceived to be the most practical and preferred embodiment, it is recognized that departures may be made therefrom within the scope of our invention.

We claim:

1. A closed loop parcel sorting conveyor system comprising an endless track means encompassing a horizontal area, a plurality of receptacle carriage means contiguously mounted on said track, coupling means uniting each of said receptacle carriage means one to the other forming an endless conveyor to ride on said endless track; each of said receptacle carriage means including guide wheels associated with said track portion to prevent lateral displacement, a pivotable receptacle portion forming a part of at least some of said receptacle carriage means, each of said pivotable receptacle portions being independently pivotal one from the other, and energizable linear actuators on said receptacle carriage means associated with said pivotable receptacles to tilt said receptacles normal to the line of travel and gravitationally discharge parcels thereon; in-line power means positioned on said track portion; two sets of friction contact means having flat surfaces thereon, the flat surfaces of the contact means of one set being adapted for engagement with the flat surfaces of the contact means of the other set, the contact means of said one set being part of said power means and the contact means of said other set being connected with said receptacle carriage means to sequentially translate power to effect forward movement of each of said receptacle carriage means and in turn move the entire contiguous endless conveyor around said endless track.

2. A closed loop parcel sorting conveyor system as defined in claim 1 wherein portions of said track means are vertically elevated above an adjacent portion, and said coupling means include universal joints including a vertical moveable block portion pivotally mounted on one of said receptacle carriage means, a horizontal tongue member fixedly mounted on an adjacent receptacle carriage means, a pivot pin passing vertically through said block portion and said tongue portion whereby said tongue portion may pivot horizontally about said pivot pin and said block portion may simultaneously pivot vertically so that each of said receptacle carriage means may conform to any portion of said track means.

3. A closed loop parcel sorting conveyor system as defined in claim 1 wherein electrical conduit strips are provided on said track means which can be energized, and wherein an electrical bus bar is provided on said receptacle carriage means connected to said linear actuator and said bus bar is slidingly engageable with said conduit strips whereby electrical energy may pass to said linear actuator at a predetermined place along said track to effect tilting of said receptacle.

4. A closed loop parcel sorting conveyor system as defined in claim 1 wherein said in-line power means includes a motor, an endless sprocket chain of connected links mounted thereon and having a portion interposed between said track means and said receptacle carriage means for movement parallel to the movement of said endless conveyor, and said friction contact means of said one set includes a plurality of separate friction pads secured to said links of said chain, said friction contact means of said other set including an elongated mateable friction pad positioned beneath each of said receptacle carriage means and vertically aligned above said friction pads of said one set and engageable thereby to impart positive anti-slip sequential movement to said receptacle carriage means.

5. A closed loop parcel sorting conveyor system as defined in claim 4 wherein the leading edge of each of said plurality of separate friction pads is downwardly curved whereby binding between said pads and said strip is prevented upon engagement.

6. A closed loop parcel sorting conveyor system as defined in claim 4 wherein a plurality of said separate friction pads may engage a single receptacle carriage means elongated mateable friction pad for a predetermined period of time.

7. A closed loop parcel sorting conveyor system as defined in claim 4 wherein there are two endless sprocket chains synchronized for parallel spaced apart movement each of which is replete with friction pads and wherein each of said receptacle carriage means includes two spaced apart elongated friction pads.

8. A closed loop parcel sorting conveyor system as defined in claim 4 wherein said endless sprocket chain extends through said track means and a chain guide means mounted on said track maintains said interposed chain portion in an engageable position.

9. A closed loop parcel sorting conveyor system as defined in claim 4 wherein said friction pads are removably mounted on said connected links.

10. A closed loop parcel sorting conveyor system as defined in claim 4 wherein said elongated strip is removably mounted on each of said receptacle carriage means.

11. A conveyor system comprising an endless track wherein portions of said track are vertically elevated above an adjacent portion and said track encompasses a horizontal area; a plurality of independent receptacle carriage means each mounted on rollers and contiguous one to the other in linear series, said carriage means being mounted on said track for movement therearound; universal coupling means connecting said receptacle carriage means one to the other; fixed electrical power means; and two sets of positive generally planar anti-slip contact means having flat surfaces thereon, the flat surfaces of the contact means of one set being adapted for engagement with the flat surfaces of the contact means of the other set, the contact means of said one set being connected with said power means and the contact means of said other set being connected with said receptacle carriage means to act as a braking force for such carriage means and to simultaneously translate forward movement sequentially to each receptacle carriage means as it comes adjacent said fixed electrical power means.

12. A conveyor system as defined in claim 11 wherein at least some of said receptacle carriage means include pivotally mounted bin portions for carrying material and electrically energizable linear actuators on said carriage means are united with said bin portions whereby when energized said bin portions may be pivoted normal to the line of travel for gravitational discharge of said material; and electrical connector means on said carriage means tied to said linear actuators which connector means is adapted to engage a source of electrical energy on said track at selected intervals.

* * * * *